US009710398B2

(12) United States Patent
Ash et al.

(10) Patent No.: US 9,710,398 B2
(45) Date of Patent: Jul. 18, 2017

(54) RE-MRU OF METADATA TRACKS TO REDUCE LOCK CONTENTION

(71) Applicant: INTERNATIONAL BUSINESS MACHINES CORPORATION, Armonk, NY (US)

(72) Inventors: Kevin J. Ash, Tucson, AZ (US); Brian J. Cagno, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 14/546,497

(22) Filed: Nov. 18, 2014

(65) Prior Publication Data
US 2016/0140053 A1 May 19, 2016

(51) Int. Cl.
*G06F 12/12* (2016.01)
*G06F 12/123* (2016.01)
*G06F 12/128* (2016.01)

(52) U.S. Cl.
CPC .......... *G06F 12/123* (2013.01); *G06F 12/128* (2013.01); *G06F 2212/6046* (2013.01); *G06F 2212/69* (2013.01)

(58) Field of Classification Search
CPC .... G06F 12/12; G06F 12/123; G06F 2212/69; G06F 12/0866; G06F 12/126; G06F 12/0862; G06F 12/125
See application file for complete search history.

(56) References Cited

U.S. PATENT DOCUMENTS

| 4,035,778 A * | 7/1977 | Ghanem | G06F 12/121 711/133 |
| 6,040,953 A * | 3/2000 | Malone | G11B 5/012 360/25 |
| 6,807,619 B1 * | 10/2004 | Ezra | G06F 12/084 711/130 |
| 6,842,826 B1 * | 1/2005 | McNutt | G06F 12/123 711/136 |
| 7,457,926 B2 * | 11/2008 | Shen | G06F 11/3409 711/118 |
| 8,510,510 B1 * | 8/2013 | Patil | G06F 17/301 711/136 |

(Continued)

OTHER PUBLICATIONS

Ding et al., "BP-Wrapper: A System Framework Making Any Replacement Algorithms (Almost) Lock Contention Free", pp. 369-380, IEEE International Conference on Data Engineering, IEEE, 2009.

*Primary Examiner* — Mano Padmanabhan
*Assistant Examiner* — Jean Edouard
(74) *Attorney, Agent, or Firm* — Griffiths & Seaton PLLC (IBM)

(57) ABSTRACT

For reducing lock contention on a Modified Least Recently Used (MLRU) list for metadata tracks, upon a conclusion of an access of a metadata track, if one of the metadata track is located in a predefined lower percentile of the MLRU list, and the metadata track has been accessed, including the access, a predetermined number of times, the metadata track is removed from a current position in the MLRU list and moved to a Most Recently Used (MRU) end of the MLRU list.

9 Claims, 4 Drawing Sheets

(56) References Cited

U.S. PATENT DOCUMENTS

| | | | | |
|---|---|---|---|---|
| 2001/0042222 A1* | 11/2001 | Kedem | ............... | G06F 11/1458 |
| | | | | 714/6.32 |
| 2003/0149843 A1* | 8/2003 | Jarvis | ................... | G06F 12/123 |
| | | | | 711/133 |
| 2008/0021853 A1* | 1/2008 | Modha | ................. | G06F 12/123 |
| | | | | 706/44 |
| 2010/0191925 A1* | 7/2010 | Blount | ............... | G06F 12/0866 |
| | | | | 711/160 |
| 2011/0202748 A1* | 8/2011 | Jacobi | ................... | G06F 9/3004 |
| | | | | 712/205 |
| 2011/0231596 A1* | 9/2011 | Goss | .................. | G06F 12/0246 |
| | | | | 711/103 |
| 2011/0246503 A1* | 10/2011 | Bender | ............ | G06F 17/30306 |
| | | | | 707/769 |
| 2012/0272010 A1* | 10/2012 | Larkby-Lahet | ....... | G06F 12/122 |
| | | | | 711/136 |
| 2012/0303861 A1* | 11/2012 | Benhase | ............ | G06F 12/0804 |
| | | | | 711/103 |
| 2013/0185513 A1* | 7/2013 | Benhase | ............... | G06F 12/123 |
| | | | | 711/136 |
| 2013/0318329 A1* | 11/2013 | Takeuchi | .............. | G06F 7/4806 |
| | | | | 712/221 |
| 2014/0082296 A1 | 3/2014 | Ash et al. | | |
| 2014/0115261 A1* | 4/2014 | Maybee | ............. | G06F 12/0897 |
| | | | | 711/136 |
| 2014/0129779 A1 | 5/2014 | Frachtenberg et al. | | |

* cited by examiner

RE-MRU OF METADATA TRACKS TO REDUCE LOCK CONTENTION

BACKGROUND OF THE INVENTION

Field of the Invention

The present invention relates in general computing systems, and more particularly to, systems and methods for increased data management efficiency in computing storage environments.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

A storage controller retains metadata to describe the location and properties of data. This metadata may be cached, along with the data itself, in order for faster performance of the storage controller. One metadata track may include information for many individual data tracks. For example, metadata describing Count Key Data (CKD) information may include on average, information pertaining to a thousand data tracks.

When metadata is modified in cache, the metadata then resides on two Least Recently Used (LRU) lists. One LRU list is an active (unmodified) list; whereas the other is a Modified LRU, or MLRU list. When a metadata track is accessed, it is necessary for the metadata track to be RE-MRUed (or, in other words, its location in the LRU lists, updated) on both lists. RE-MRU is an operation where a track is removed from its location in the LRU list and moved to the top of the MRU list. RE-MRUing on the active list, for example, prevents a metadata track from being demoted too soon; whereas RE-MRUing on the MLRU list prevents the metadata track from being destaged too soon.

If the metadata track is destaged too soon, at least two challenges may result. First, tracks (metadata or otherwise) that are destaged too soon may cause related Input/Output (I/O) operations, and consequently, the overall performance of the storage system may be negatively affected. Second, tracks that need to modify metadata may need to wait while the metadata is destaged. As a result, response time delays for the host may also be negatively affected, which may also cause overall storage performance degradation.

To RE-MRU a metadata track, a lock is generally taken on the LRU list. Other techniques for addressing metadata tracks on the MLRU list may be ineffective for at least the following two reasons. First, it is beneficial for cache to retain an accurate count of modified metadata tracks in the cache itself. Secondly, an amount of modified metadata in cache is generally much smaller than the number of all active tracks in cache. As a result, a deferred MRU cache mechanism, for example, may contain a large percentage of modified metadata tracks in cache. This may distort the LRU methodologies applied to modified metadata tracks.

Accordingly, and in view of the foregoing, a need exists for a mechanism to reduce potential lock contention on the Modified LRU (MLRU) list for metadata tracks.

To address this need, various embodiments for reducing lock contention on a Modified Least Recently Used (MLRU) list for metadata tracks are provided. In one such embodiment, a method for reducing lock contention on a MLRU list for metadata tracks by a processor device is provided. Upon a conclusion of an access of a metadata track, if one of the metadata track is located in a predefined lower percentile of the MLRU list, and the metadata track has been accessed, including the access, a predetermined number of times, the metadata track is removed from a current position in the MLRU list and moved to a Most Recently Used (MRU) end of the MLRU list.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, a storage controller retains metadata to describe the location and properties of data. This metadata may be cached, along with the data itself, in order for faster performance of the storage controller. One metadata track may include information for many individual data tracks. For example, metadata describing Count Key Data (CKD) information may include on average, information pertaining to a thousand data tracks.

When metadata is modified in cache, the metadata then resides on two Least Recently Used (LRU) lists. One LRU list is an active (unmodified) list; whereas the other is a Modified LRU, or MLRU list. When a metadata track is accessed, it is necessary for the metadata track to be RE-MRUed (or, in other words, its location in the LRU lists, updated) on both lists. RE-MRU is an operation where a track is removed from its location in the LRU list and moved to the top of the MRU list. RE-MRUing on the active list, for example, prevents a metadata track from being demoted too soon; whereas RE-MRUing on the MLRU list prevents the metadata track from being destaged too soon.

If the metadata track is destaged too soon, at least two challenges may result. First, tracks (metadata or otherwise) that are destaged too soon may cause related Input/Output (I/O) operations, and consequently, the overall performance of the storage system may be negatively affected. Second, tracks that need to modify metadata may need to wait while the metadata is destaged. As a result, response time delays for the host may also be negatively affected, which may also cause overall storage performance degradation.

To RE-MRU a metadata track, a lock is generally taken on the LRU list. Other techniques for addressing metadata tracks on the MLRU list may be ineffective for at least the following two reasons. First, it is beneficial for cache to retain an accurate count of modified metadata tracks in the cache itself. Secondly, an amount of modified metadata in cache is generally much smaller than the number of all active tracks in cache. As a result, a deferred MRU cache mechanism, for example, may contain a large percentage of modified metadata tracks in cache. This may distort the LRU methodologies applied to modified metadata tracks.

Accordingly, and in view of the foregoing, a need exists for a mechanism to reduce potential lock contention on the Modified LRU (MLRU) list for metadata tracks.

To address this need, the mechanisms of the illustrated embodiments perform various determinations as to the status of metadata tracks in cache. For example, and as will be further described, these mechanisms may determine if a metadata track is currently located in a predefined lower percentile of the MLRU list. In addition, these mechanisms may determine if a metadata track has been accessed a predetermined number of times.

To perform these determinations, again and as will be further described, the mechanisms of the illustrated embodiments may implement aspects such as sequence numbering relating to each of the metadata tracks, such that the metadata's current location may be compared against other metadata tracks in the MLRU list. In addition, the mechanisms of the illustrated embodiments may implement certain mathematical functions, such as a Modulo operation, to determine a current accesses count.

Depending on the calculated determinations as to the status of these metadata tracks, the mechanisms of the illustrated embodiments may then RE-MRU the track to update its location, for example, or take other action. In this way, the metadata track is not destaged nor demoted too soon, while the system does not incur excessive lock contention resulting from too many RE-MRU operations occurring in the system. As a result, the storage environment benefits by being able to achieve greater efficiencies of operation.

Figure 1:
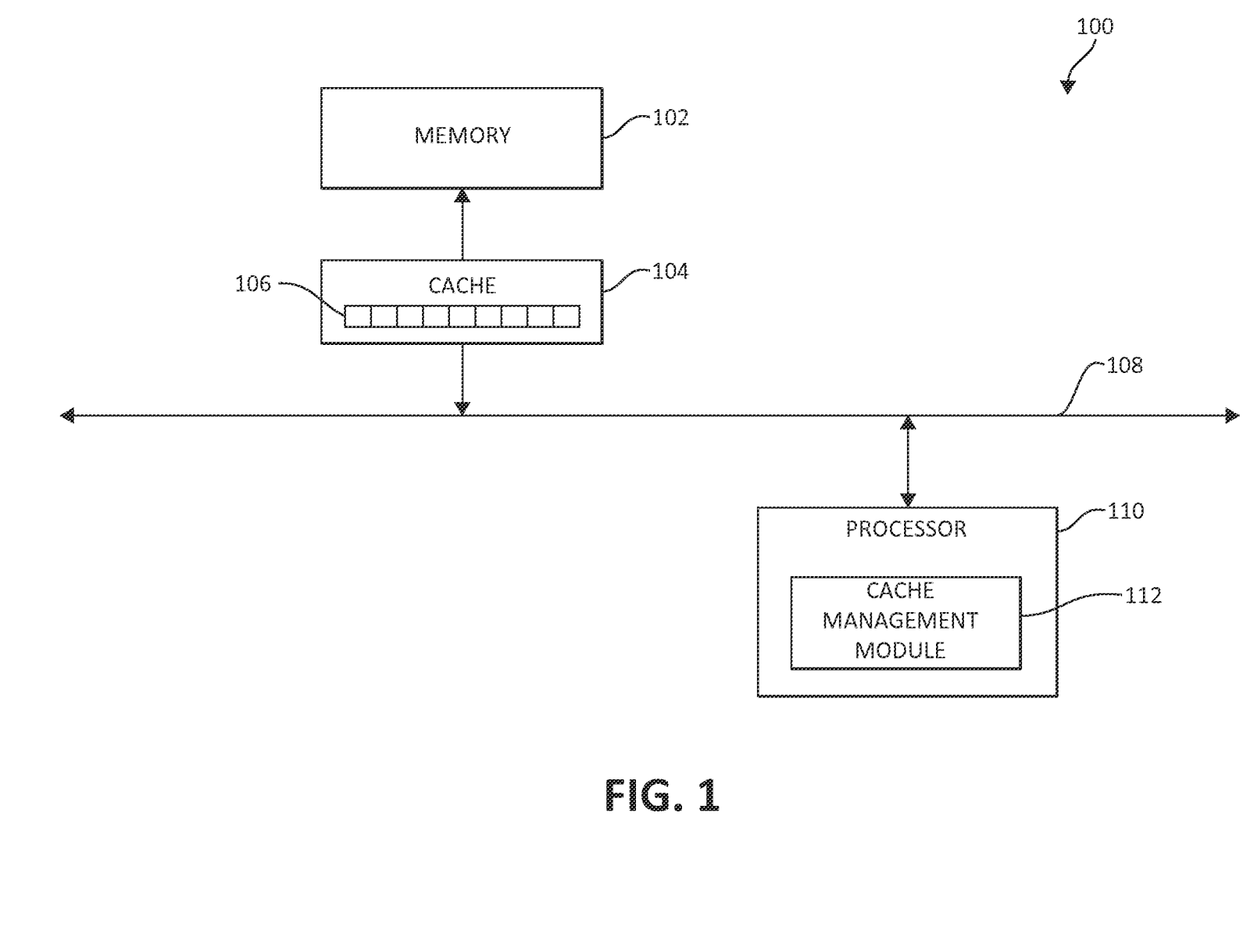
FIG. 1 is an exemplary block diagram showing a hardware structure for cache management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a cache/data management module 112, which comprises computer-readable code that, when executed by processor 110, causes processor 110 to perform data management operations in accordance with aspects of the illustrated embodiments. In the various embodiments, processor 110 acts to reduce lock contention on a Modified Least Recently Used (MLRU) list for metadata tracks wherein upon a conclusion of an access of a metadata track, if one of the metadata track is located in a predefined lower percentile of the MLRU list, and the metadata track has been accessed, including the access, a predetermined number of times, the metadata track is removed from a current position in the MLRU list and moved to a Most Recently Used (MRU) end of the MLRU list.

Processor 110, in other embodiments, determines at least one of if the metadata track is located in the predefined lower percentile, and a number of current accesses for the metadata track.

Processor 110, in various other embodiments, determines, following the access, if the metadata track currently exists on the MLRU list.

Processor 110, in various other embodiments, if the metadata track does not currently exist on the MLRU list, adds the metadata track to the MRU end of the MLRU list.

Processor 110, in various other embodiments, pursuant to determining the number of current accesses further includes, if the metadata does currently exist on the MLRU list, performs at least one of incrementing the number of current accesses, performing a modulo with a predetermined number as a function of the number of current accesses, and if a result of the function is zero (0), removing the metadata track from the current position and moving the metadata track to the MRU end.

Processor 110, in various other embodiments, pursuant to determining if the metadata track is located in the predefined lower percentile, updates a current sequence number associated with the metadata track.

Finally, in various other embodiments, processor 110, pursuant to determining if the metadata track is located in the predefined lower percentile, if the metadata does currently exist on the MLRU list, determines if the metadata track is located in the predefined lower percentile by determining a current location of the metadata track as a function of the current sequence number of the metadata track, a sequence number of an additional metadata track currently on the MRU end of the MLRU list, and a sequence number of an additional metadata track currently on the LRU end of the MLRU list.

Figure 2:
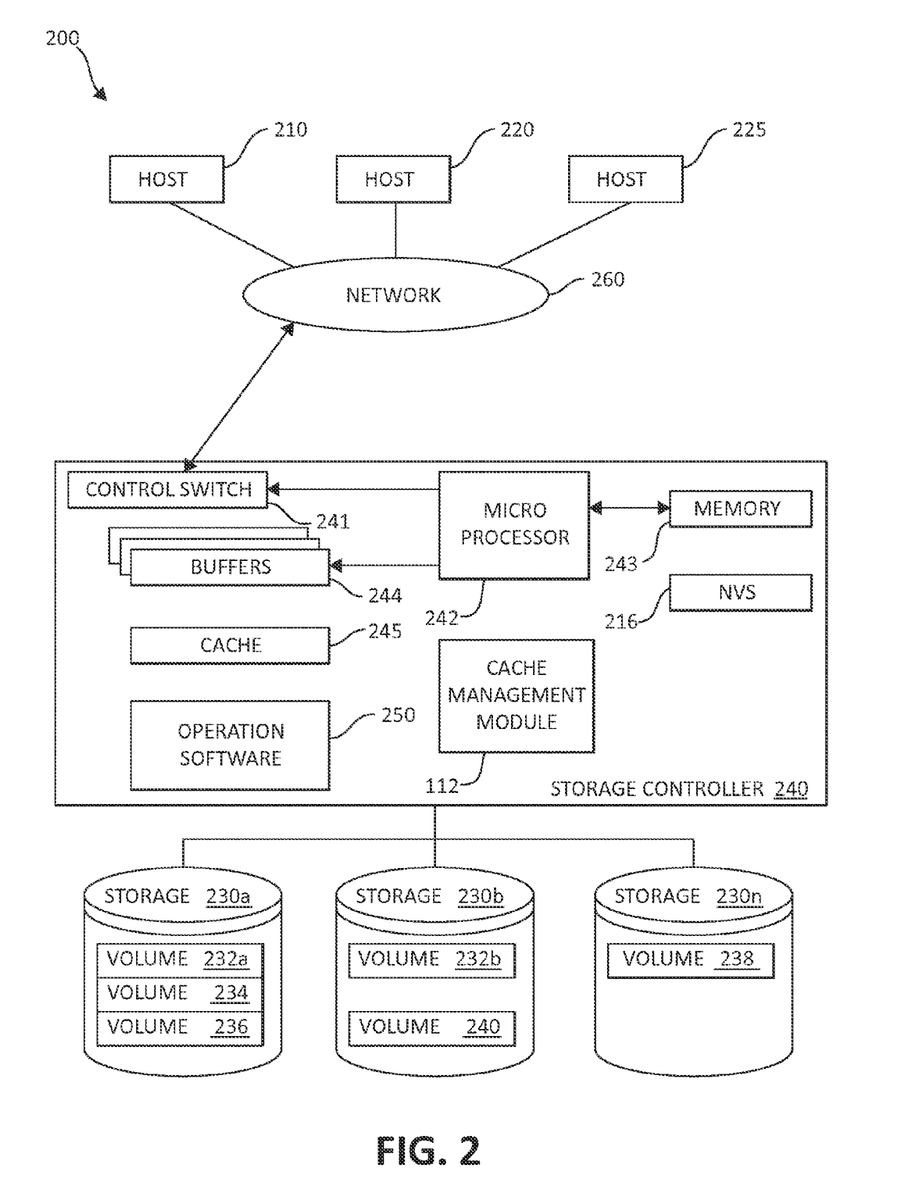
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a cache management module 112. The cache management module 112 may incorporate internal memory (not shown) in which the destaging algorithm may store unprocessed, processed, or "semi-processed" data. The cache management module 112 may work in conjunction with each and every component of the storage controller 240, the hosts 210, 220, 225, and other storage controllers 240 and hosts 210, 220, and 225 that may be remotely connected via the storage fabric 260. Cache management module 112 may be structurally one complete module or may be associated and/or included with other individual modules. Cache management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the cache management module 112, in which information may be set. The multiple buffers 244 may be implemented to assist with the methods and steps as described herein.

Figure 3:
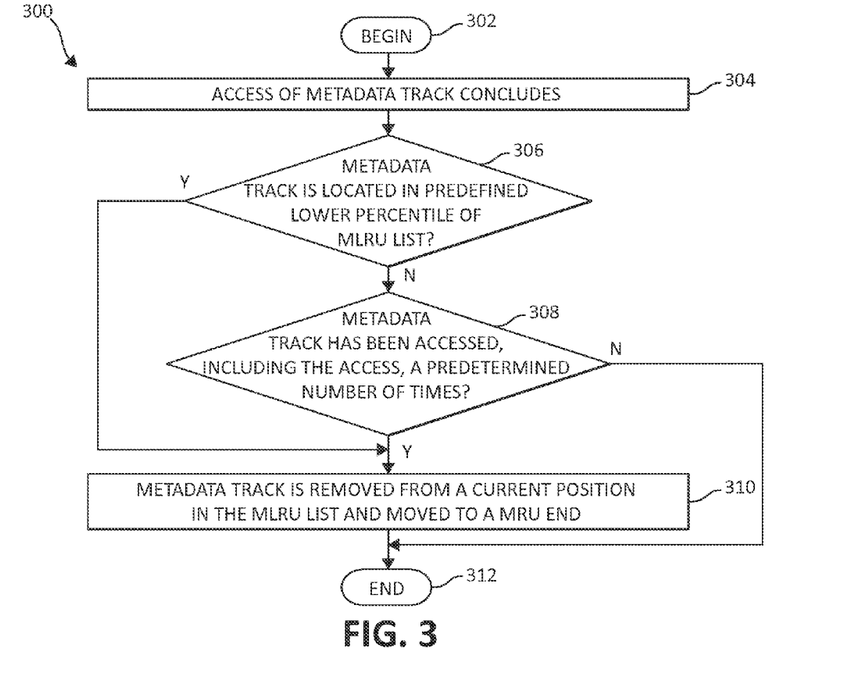
FIG. 3 is a flow chart diagram illustrating an exemplary method for increased efficiency in data management in a computing storage environment, again in which aspects of the present invention may be realized.

Turning now to FIG. 3, a flow chart diagram, illustrating a generalized method method 300 for data management, is depicted. Method 300 begins (step 302). An access of a metadata track concludes (step 304). A following decision step 306 queries whether the metadata track is located in a predefined lower percentile of the MLRU list. If no, a following decision step 308 queries whether the metadata track has been accessed, including the instant access, a predetermined number of times. If either of those queries returns yes, the metadata track is removed from a current position in the MLRU list and moved to a MRU end of the MLRU list (step 310). The method 300 then ends (step 312).

As the various aspects of FIG. 3 suggest, the mechanisms of the illustrated embodiments may, for example, may maintain a count of a number of times an instant metadata track is accessed when the metadata track is residing on the modified list. By maintaining this count, the mechanisms of the illustrated embodiments benefit the reduction of lock contention by only RE-MRUing the modified track after a predetermined number of, for example, N accesses instead of RE-MRUing the modified metadata track after every access.

In addition, the mechanisms of the illustrated embodiments may, alternatively, RE-MRU the modified metadata track, once the track reaches a predetermined bottom portion of the MLRU list.

With regard to using a count of times of access for determining whether the instant modified metadata track should be RE-MRUed, a variety of additional aspects may be implemented towards this mechanism. For example, in one embodiment, following a metadata track access, a check may be made to determine if the metadata track already exists on the Modified Least Recently Used (MLRU) list. If it does not reside currently on the MLRU list, the track may then be added to the MRU end of the list. If however, the track is already resident on the list, then the number of accesses currently maintained may then be incremented. In additional functionality, a Modulo operation may be taken with a predetermined number (e.g., N) using the count of accesses. For example, the operation may take the form of:

count of accesses=(count of accesses+1)Modulo N.

If the determined count of accesses is zero (0), then the instant metadata track may then be Re-MRUed. Otherwise, the system may do nothing to the metadata track until the next access is complete. As previously indicated, the RE-MRU operation is performed by taking a lock on the MLRU list, and then removing the track from its current position and adding it to the top of the MLRU list. The lock is then released once the operation has been completed.

In an alternative embodiment, with reference to determining whether the modified metadata track is found in a predetermined lower percentile of the MLRU list as previously described, additional aspects may be described herein in furtherance of this functionality. For example, a sequence number may be initialized for the instant metadata track, which follows the metadata track as it is accessed and/or modified. When a track is added to the MLRU list, the track may be updated with a current sequence number. The sequence number may be a running counter, or a timestamp, for example. As a result, the metadata track may be updated with the current sequence number, while the sequence number is incremented following the track's update (in a running counter scheme). In an alternative embodiment, the track may be stamped with a current time.

In view of the above, once access to a metadata track is ended, the metadata track may be examined to determine if the track is already on the MLRU list, in an operation similar to that previously described. If no, and again as previously described, the metadata track may be added to the MRU end of the MLRU list.

If, however, the metadata track is already resident on the MLRU list, then the position of the metadata track on the list may be determined in a variety of ways. For example, in one embodiment, a current position P from the top of the MLRU list in a percentile basis may be defined as P=100*(Sequence number of track on MRU end of MLRU list−Sequence number of current track)/Sequence number of track on MRU end of MLRU list−Sequence number of track on LRU end of MLRU list).

If the determined P position from the top of the MLRU list is in a predetermined Nth percentile, such as, for example 50%, then the instant metadata track is not subject to RE-MRU. If the position is in a lower percentile (e.g., lower than 50%), then the track may be RE-MRUed.

The advantages of the foregoing are many-fold. The RE-MRU operations are reduced, and hence, lock contention on the MLRU list is thereby reduced correspondingly. If the track is not frequently accessed, then the track eventually moves to the bottom of the MLRU list and is destaged. Metadata tracks, in general, are accessed more frequently than user data tracks, since metadata tracks generally contain information about many data tracks. As a result, if the metadata track is used frequently, it will be accessed before the track moves to the bottom of the MLRU list. Accordingly, using the mechanisms of the illustrated embodiments, the generalized LRU behavior of metadata tracks in storage environments is not affected.

Figure 4:
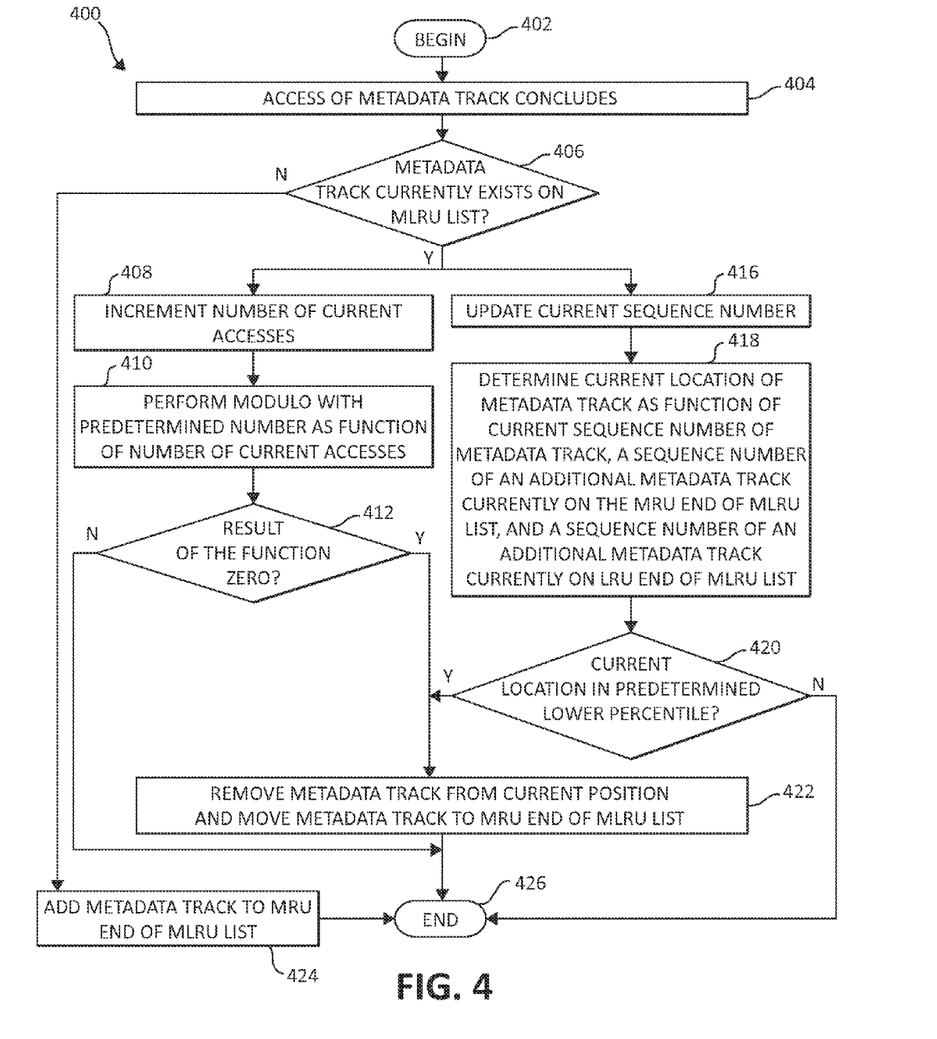
FIG. 4 is an additional flow chart diagram illustrating an exemplary method for performing various operations for data management enhancement, again in which aspects of the present invention may be implemented.

In view of the forgoing, consideration is now made to FIG. 4, following, which illustrates in greater detail, several aspects of the mechanisms of the present invention. Method 400 begins (step 402) with a conclusion of an access to a metadata track (step 404). Method 400 then moves to decision 406, which queries whether the metadata track currently resides on the MLRU list. If no, the metadata track is added to the MRU end of the MLRU list (step 424) and the method 400 ends (step 426).

Returning to step 406, if the metadata track currently resides on the MLRU list, then two alternative methodologies are possible. The first methodology begins with step 408, which increments a number of current accesses. Continuing to step 410, a modulo operation is performed with a predetermined number (e.g., N) as a function of the number of current accesses. If a result of the function is not zero, the method 400 ends (again, step 426). Returning to decision step 412, if the result of the function is zero, the instant metadata track is removed from its current position and moved to the MRU end of the MLRU list (step 422). Here again, the method 400 then ends (again, step 426).

Returning to decision step 406, the alternative methodology begins in step 416, as shown, which updates a current sequence number that has been associated with the instant metadata track. Method 400 then continues to step 418, which determines a current location of the metadata track as a function of the current sequence number of the metadata track, a sequence number of an additional metadata track currently on the MRU end of the MLRU list, and a sequence number of an additional metadata track currently on the LRU end of the MLRU list. Based on the current location determined in step 418, decision step 420 then queries whether the current location is located in a predetermined lower percentile. If no, the method 400 then ends (again, step 426). Returning to decision step 420, if the current location is located in the predetermined lower percentile, the method 400 continues as previously to step 422, which removes the metadata track from the current position, and moves the metadata track to the MRU end of the MLRU list. The method 400 then ends (again, step 426).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for reducing lock contention on a Modified Least Recently Used (MLRU) list for metadata tracks by a processor device, comprising:
   upon a conclusion of an access of a metadata track, the metadata track holding information associated with at least one data track, if one of:
   the metadata track is located in a predefined lower percentile of the MLRU list, and
   the metadata track has been accessed, including the access, a predetermined number of times,
   the metadata track is removed from a current position in the MLRU list and moved to a Most Recently Used (MRU) end of the MLRU list;
   determining if the metadata track is located in the predefined lower percentile, and a number of current accesses for the metadata track; wherein determining the number of current accesses further includes, if the metadata does currently exist on the MLRU list, performing:
   incrementing the number of current accesses,
   performing a modulo with a predetermined number as a function of the number of current accesses, and
   if a result of the function is zero (0), removing the metadata track from the current position and moving the metadata track to the MRU end; and
   determining, following the access, if the metadata track currently exists on the MLRU list; wherein if the metadata track does not currently exist on the MLRU list, the metadata track is added to the MRU end of the MLRU list.

2. The method of claim 1, wherein determining if the metadata track is located in the predefined lower percentile further includes updating a current sequence number associated with the metadata track.

3. The method of claim 2, wherein determining if the metadata track is located in the predefined lower percentile further includes, if the metadata does currently exist on the MLRU list, further including determining if the metadata track is located in the predefined lower percentile by determining a current location of the metadata track as a function of the current sequence number of the metadata track, a sequence number of an additional metadata track currently on the MRU end of the MLRU list, and a sequence number of an additional metadata track currently on the LRU end of the MLRU list.

4. A system for reducing lock contention on a Modified Least Recently Used (MLRU) list for metadata tracks, comprising:
 a processor device, operable in a multi-core computing storage environment, wherein the processor device, upon a conclusion of an access of a metadata track, the metadata track holding information associated with at least one data track, if one of:
  the metadata track is located in a predefined lower percentile of the MLRU list, and
  the metadata track has been accessed, including the access, a predetermined number of times,
removes the metadata track from a current position in the MLRU list and moves the metadata track to a Most Recently Used (MRU) end of the MLRU list;
 determines if the metadata track is located in the predefined lower percentile, and a number of current accesses for the metadata track; wherein determining the number of current accesses further includes, if the metadata does currently exist on the MLRU list, performing:
  incrementing the number of current accesses,
  performing a modulo with a predetermined number as a function of the number of current accesses, and
  if a result of the function is zero (0), removing the metadata track from the current position and moving the metadata track to the MRU end; and
 determines, following the access, if the metadata track currently exists on the MLRU list; wherein if the metadata track does not currently exist on the MLRU list, the metadata track is added to the MRU end of the MLRU list.

5. The system of claim 4, wherein the processor device, pursuant to determining if the metadata track is located in the predefined lower percentile, updates a current sequence number associated with the metadata track.

6. The system of claim 5, wherein the processor device, pursuant to determining if the metadata track is located in the predefined lower percentile, if the metadata does currently exist on the MLRU list, determines if the metadata track is located in the predefined lower percentile by determining a current location of the metadata track as a function of the current sequence number of the metadata track, a sequence number of an additional metadata track currently on the MRU end of the MLRU list, and a sequence number of an additional metadata track currently on the LRU end of the MLRU list.

7. A computer program product reducing lock contention on a Modified Least Recently Used (MLRU) list for metadata tracks by a processor device, the computer program product comprising a non-transitory computer-readable storage medium having computer-readable program code portions stored therein, the computer-readable program code portions comprising:
 a first executable portion that, upon a conclusion of an access of a metadata track, the metadata track holding information associated with at least one data track, if one of:
  the metadata track is located in a predefined lower percentile of the MLRU list, and
  the metadata track has been accessed, including the access, a predetermined number of times,
 removes the metadata track from a current position in the MLRU list and moves the metadata track to a Most Recently Used (MRU) end of the MLRU list;
 a second executable portion that determines if the metadata track is located in the predefined lower percentile, and a number of current accesses for the metadata track; wherein determining the number of current accesses further includes, if the metadata does currently exist on the MLRU list, performing:
  incrementing the number of current accesses,
  performing a modulo with a predetermined number as a function of the number of current accesses, and
  if a result of the function is zero (0), removing the metadata track from the current position and moving the metadata track to the MRU end; and
 a third executable portion that determines, following the access, if the metadata track currently exists on the MLRU list; wherein if the metadata track does not currently exist on the MLRU list, the metadata track is added to the MRU end of the MLRU list.

8. The computer program product of claim 7, further including a fourth executable portion that, pursuant to determining if the metadata track is located in the predefined lower percentile, updates a current sequence number associated with the metadata track.

9. The computer program product of claim 8, further including a fifth executable portion that, pursuant to determining if the metadata track is located in the predefined lower percentile, if the metadata does currently exist on the MLRU list, determines if the metadata track is located in the predefined lower percentile by determining a current location of the metadata track as a function of the current sequence number of the metadata track, a sequence number of an additional metadata track currently on the MRU end of the MLRU list, and a sequence number of an additional metadata track currently on the LRU end of the MLRU list.

\* \* \* \* \*